(12) United States Patent
Schiestl

(10) Patent No.: US 10,891,093 B2
(45) Date of Patent: Jan. 12, 2021

(54) SYSTEM FOR OPERATING TEXTILE PRINTING MACHINES INCLUDING DATA-PROCESSING MODULE

(71) Applicant: Angelo Schiestl, Langkampfen (AT)

(72) Inventor: Angelo Schiestl, Langkampfen (AT)

(*) Notice: Subject to any disclaimer, the term of this patent is extended or adjusted under 35 U.S.C. 154(b) by 0 days.

(21) Appl. No.: 16/337,360

(22) PCT Filed: Aug. 21, 2017

(86) PCT No.: PCT/EP2017/070993
§ 371 (c)(1),
(2) Date: Mar. 27, 2019

(87) PCT Pub. No.: WO2018/059832
PCT Pub. Date: Apr. 5, 2018

(65) Prior Publication Data
US 2020/0034096 A1   Jan. 30, 2020

(30) Foreign Application Priority Data

Sep. 28, 2016   (EP) .................................. 16191200

(51) Int. Cl.
*G06F 3/12* (2006.01)
(52) U.S. Cl.
CPC .......... *G06F 3/1261* (2013.01); *G06F 3/1205* (2013.01); *G06F 3/1263* (2013.01);
(Continued)
(58) Field of Classification Search
CPC .... G06F 3/1261; G06F 3/1203; G06F 3/1211; G06F 3/1218; G06F 3/1219; G06F 3/122;
(Continued)

(56) References Cited

U.S. PATENT DOCUMENTS

| 5,438,922 A | 8/1995 | Bubley et al. |
| 7,474,433 B2 * | 1/2009 | Snyder ............... G06Q 30/0225 358/1.13 |

(Continued)

FOREIGN PATENT DOCUMENTS

| EP | 1 197 841 A2 | 4/2002 |
| WO | 2013/133789 A1 | 9/2013 |

OTHER PUBLICATIONS

International Search Report issued in PCT/EP2017/070993; dated Nov. 20, 2017.

(Continued)

*Primary Examiner* — Juan M Guillermety
(74) *Attorney, Agent, or Firm* — Studebaker & Brackett PC

(57) ABSTRACT

The present invention relates to a system for operating textile printing machines, with a first textile printing machine and at least one second textile printing machine, which machines are provided in a first entity or a second entity, which are independent of each other, wherein each textile printing machine is provided with a data-processing module, which detects data about the state, set-up and/or utilization of the textile printing machine, wherein the textile printing machine transmits the detected data to a data center, independent from entities and/or location, and wherein the data center is configured to accept print jobs from third parties and, based on the transmitted data, to transmit at least one print job fitting the data to one of the at least two textile printing machines. Moreover, the invention relates to a module for the system according to the invention.

9 Claims, 1 Drawing Sheet

(52) U.S. Cl.
CPC .......... *G06F 3/1268* (2013.01); *G06F 3/1274* (2013.01); *G06F 3/1284* (2013.01)

(58) Field of Classification Search
CPC ...... G06F 3/1235; G06F 3/1239; G06F 3/126; G06F 3/1268; G06F 3/1263; G06F 3/1281; G06F 3/1274; G06F 3/1205; G06F 3/1284
See application file for complete search history.

(56) References Cited

U.S. PATENT DOCUMENTS

| | | | |
|---|---|---|---|
| 10,447,878 B2* | 10/2019 | Takatani | G03G 15/5004 |
| 2002/0140969 A1 | 10/2002 | Ishida | |
| 2011/0188069 A1 | 8/2011 | Giannetti et al. | |
| 2011/0261390 A1 | 10/2011 | Ray et al. | |
| 2012/0026545 A1* | 2/2012 | Miura | G06F 3/121 |
| | | | 358/1.15 |
| 2012/0218594 A1* | 8/2012 | Komine | G06F 3/126 |
| | | | 358/1.15 |
| 2012/0327459 A1* | 12/2012 | Huster | G06F 3/1261 |
| | | | 358/1.15 |
| 2015/0153970 A1* | 6/2015 | Tomida | G06F 3/126 |
| | | | 358/1.15 |
| 2017/0087866 A1* | 3/2017 | Bhaskaran | G06F 3/1219 |

OTHER PUBLICATIONS

An Office Action dated by the European Patent Office dated Apr. 10, 2019, which corresponds to European Patent Application No. 16191200.1-1221 and is related to U.S. Appl. No. 16/337,360.

International Preliminary Report on Patentability issued in PCT/EP2017/070993; completed Jan. 7, 2019.

* cited by examiner

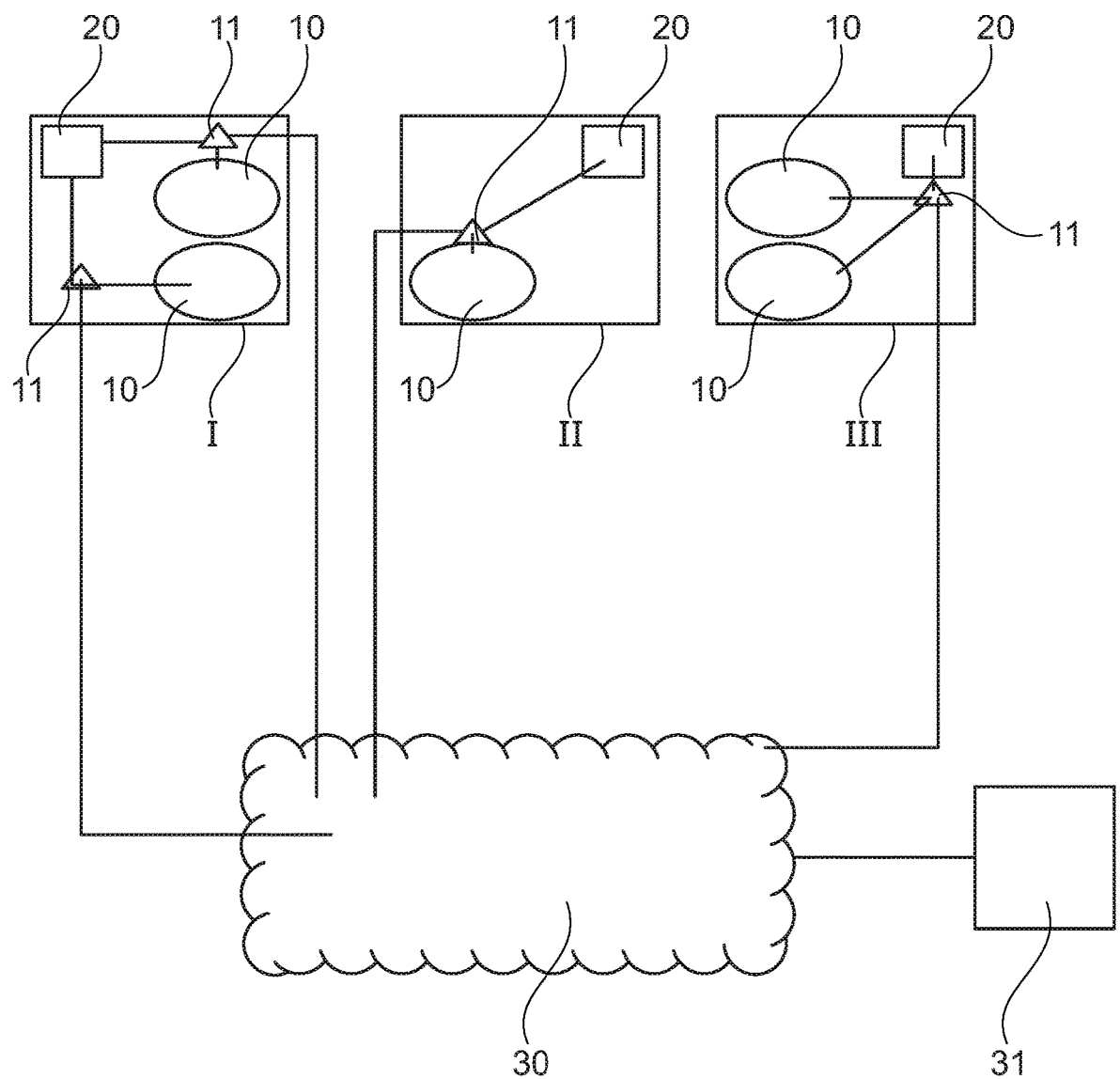

SYSTEM FOR OPERATING TEXTILE PRINTING MACHINES INCLUDING DATA-PROCESSING MODULE

The invention relates to a system for operating textile printing machines according to the preamble of claim 1.

In the operation of textile printing machines, it is usual for individual print jobs to be processed one after another through the device. The operating entity of the textile printing machine can be commissioned by different clients. Depending upon the order situation, idle periods can come to pass, in which the textile printing machine remains unused. This can be disadvantageous in terms of economic considerations, as well as from the point of view of the textile printing machine operation. For example, printing ink can thus dry on print heads in a printing machine if it remains unused for a longer time, which can lead to a clogging of the ink nozzles. A limited shelf-life of the printer ink can also, for example, lead to a part of the printer ink having to be discarded, should the textile printing machine not be sufficiently utilized.

Usually, a first textile printing machine and at least one second textile printing machine are arranged, which are provided in a first entity or a second entity, which are independent of each other.

US 2011/0261390 A1 relates to a system, method and computer program product for implementing a print service network for the uniform utilization of a plurality of print shops for the printing of documents. The system includes a data center with a server, wherein individual controllers are connected with the server, which controllers are assigned to individual print shops. Data from the individual print shops can be forwarded to the data center via the controllers. The ways and manners how the data is input is not disclosed.

WO 2013/133789 A1 discloses the automated assignment of orders to service providers. A so-called broker is provided, to receive print jobs and to assign these jobs to individual service providers. The assignment takes place in particular via the provision of framework conditions through the service provider.

EP 1 197 841 A2 discloses an internet printing brokering system and method in which users can independently select, from a preselection of providers, a desired provider for the execution of a print job. The providers can transmit data about their printing machines via a computer terminal with keyboard.

The object of the invention is to disclose a system for operating textile printing machines, which makes an economical utilization of printing time, as well as of supply materials of the textile printing machine possible in an efficient manner.

The object is solved according to the invention through a system with the features of claim 1. Advantageous embodiments are specified in the dependent claims.

The system is characterized according to the invention in that each textile printing machine is provided with a data processing module, which detects data about the state, the set-up and/or utilization of the textile printing machine, in that the textile printing machines transmits the detected data to a data center independently of entity and/or location, and in that the data center is configured to accept print jobs from third parties and, based on the transmitted data, to transmit at least one print job fitting the data to one of the at least two textile printing machines.

A basic concept of the invention consists in making a system available which transmits information about textile printing machines of different entities to an independent unit, for example in the form of a data center and, based on the transmitted data, to receive a print job, from the unit, for processing. The textile printing machine is preferably provided by manufacturers with the corresponding modules, so that these only have to be activated at the request of a buyer. The data center can be operated by the machine manufacturer.

The individual entities can be independent of each other, that is each can comprise its own dataset with own local print jobs, wherein no data exchange, in particular no direct data exchange in the form of print jobs, between the entities is provided.

Based on the transmitted data, the unit can deliver a print job to at least one of the textile printing machines, wherein the print job can come from a source independent of the entity, and, based on, for example, available "textile printing machine time", that is a time in which, at the point in time of the job issuance, through the unit, no print jobs is present through the respective textile printing machine. Further additional or alternative criteria for the issuing and transmitting of print jobs from the unit to at least one of the textile printing machines can be type and amount of provided supply materials and units, such as textile type, textile quality, printer ink, provided print method (inkjet, screen printing, etc.) or pre-treatment materials and pre-treatment units of the respective textile printing machines. The remaining times of the machines can be exploited and be economically used.

The system according to the invention can essentially be an arrangement as well as also a method. The independence of the entities, according to the system according to the invention, can in particular consist therein that the at least one textile printing machine of the one entity belongs to a first local network, wherein at least one further textile printing machine of at least one further entity is provided in a further, separate local network. The local network of the one entity can thusly in particular be separated from a local network of a further entity, wherein the at least two local networks of the at least two entities have no direct data connection to one another or with each other and/or a data exchange is not provided. The at least two entities can in particular be configured therein that each entity accepts, in its own right, print jobs for its at least one textile printing machine, independently of the other entity, wherein the second entity, from the point of view of the data processing/transmission, can receive no indication about the print job of the first entity.

According to the invention, the textile printing machines of the respective entities are configured to process print jobs, which were commissioned to the respective entity directly by a customer/interested party. According to the invention, a collection of persons, which does not represent a direct customer of the entity, which directly commissions a print job to the entity, can thusly be meant under the third parties, which transmit print jobs to the data center. The third parties can thus, according to the invention, be a further source, independent of the direct entity jobs, of print jobs.

The module according to the invention can in particular be configured to detect all operationally-relevant data for the operation of a textile printing machine, which data can contribute to assign a fitting print job to a textile printing machine. At least the supply materials assigned to the textile machine, such as for example the assigned textile or the assigned printer inks, the print jobs already assigned to the textile machine, which jobs are directly assigned to the textile printing machine through the respective entity, as well as other parameters which can be decisive to the operation of a textile printing machine, belong hereto.

Based on the information made available, the data center can perform an assignment of a print job from a third party to a printing machine, as well as also essentially determine the suitability of the textile printing machine, for example with regard to the supply materials, as well as the printing time available, on the textile printing machine.

If the data center determines a textile printing machine suitable for the print job of a third party, the data center can assign the print job to the corresponding textile printing machine for processing or transmit the data necessary for a printing to the textile printing machine. The print job from a third party can thereby either immediately be processed through the textile printing machine, or be assigned to a queue, in which print jobs of the respective entity, as well as from print jobs, assigned by the data center, from third parties are located, in order to be processed one after the other.

Should at least one entity be commissioned directly through customers for more print jobs than it can process, or is not capable of processing print jobs due to other reasons, the entity can, according to an advantageous further development of the system according to the invention, transmit these print jobs to the data center, for example via the module, which data center can forward this order to textile printing machines in the same way as a print job from a third party.

According to a preferred further development of the system according to the invention, it is provided that the data center is configured to match the respective utilization of the at least two textile printing machines with an expected print duration of print jobs from the data center. Prior to the transmission of a print job of a third party through the data center to one of the textile printing machines, it can be of advantage to initially carry out an establishing of the available printing time. Preferably, the data center transmits a print job of a third party to one of the textile printing machines if enough free printing time is available on the respective textile printing machine. Should sufficient printing time be present on none of the textile printing machines within a previously-defined time period, the data center can add the print job, for example in the form of a collection of data, to a global wait list. The defined time period can be set as desired and amount to, for example, one or multiple hours, one or multiple days, one or multiple weeks or months.

In particular, a maximum wait time can be indicated through the third party during the transmission of the print job to the data center, wherein the system, in particular the data center, is configured to inform the third party should a processing of the print job apparently not be possible in the desired time. Free printing time can for example come about thereby in that a print job is cancelled, that is deleted or interrupted, by the respective entity.

It is particularly expedient, according to a further development of the invention, that, at least for the first textile printing machine and the at least second textile printing machine, a control means, in particular a server, is in each case provided, which means is configured to provide local print jobs respectively to one of the at least two textile printing machines. For the providing of multiple print jobs for the textile printing machines of the respective entity, it can be advantageous to manage the print jobs via suitable means, for example a server for configuring an order of print jobs to be executed, or to assign print jobs to individual textile printing machines. According to the invention, the means can be configured to manage print jobs which were directly, that is locally submitted directly to an entity. The means can in particular be in communication with the module according to the invention. The data center can thus have access to the respective job lists of print jobs to be accomplished of the respective entity. In particular, through the access to the jobs, or information about the jobs of the respective entities, the data center can determine idle times of the respective textile printing machine.

According to the present invention, it is particularly preferred that the at least two control means are in each case provided as a part of on the separate digital networks.

According to a preferred embodiment of the invention, it is provided that, at least in one of the separate digital networks, at least one second textile printing machine is provided. Within the respective separate digital network, 2, 3, 4, 5, or more textile printing machines can thus be provided. These can, as required, be driven through the same control means, or by means of separate control means, for processing print jobs.

According to an appropriate further development of the present invention, it is provided that the data center comprises an input mask which can be reached, in particular via the internet, and is configured to provide print jobs from the third parties to the data center. Preferably, the data center comprises means via which it is made possible for third parties to transmit print jobs to the data center directly. It is hereby particularly preferred that the transmission of the print jobs to the data center can take place regardless of location.

Regardless of location can in particular mean that the data center does not necessarily receive the print job of a third party via a fixed stationary access to the data center.

According to the invention, it is preferred that the input mask is representable within an internet browser window, and a print job by a third party, for the data center, can be input, in the input mask from any computer with an internet connection. The print job can thusly be transmitted by a third party worldwide to the data center via any arbitrary internet access. According to a variant of the embodiment of the invention, it is provided that the connection of an internet-capable computer with the data center can be established by means of a software, which is previously executed, in particular installed on the computer. The input mask, as well as the software can, in a preferred way, comprise a user interface for transmitting print jobs. The print job can be a file which comprises a print image, in particular with a sample and/or a printer color. The input mask or software can also be configured to develop a print job, in the form of a print design, in the browser window or within the software and to transmit the finished draft to the data center.

Preferably, the input mask or the software can comprise means which make a subsequent processing, supplementing and/or or completion of a print design by the third party possible, before the print job with the print design or print image is transmitted to the print center.

According to a particularly advantageous embodiment of the system according to the invention, it is provided that subsequently-provided local print jobs, in the respective entities, with a priority relative to earlier print jobs of the data center, are processable by the textile printing machines. For an improved utilization of the printing time of the textile printing machines, it can be advantageous to favor local print jobs which the respective entities receive directly from customers, relative to print jobs which are transmitted through the data center. If at least one print job, in particular for future processing through one of the textile printing machines, was thusly transmitted, through the data center, to a textile printing machine, a module, or a control server, the printing time of the textile printing machine occupied through the print job of a third party can be replaced through a local print job. This can be advantageous to furthermore make available dispositionary power to the respective company over the accomplished print jobs in their company. Short-notice changes can thus, in the course of print jobs to processed, be adapted, as necessary, to the wishes of the respective entity. The print center can, as is required, be excluded from the respective local network through the entity, which can prevent an issuing of print jobs through the data center.

An embodiment of the system according to the invention lies with the control means of the textile printing machine being configured to pause and/or to cancel an accepted print job from the data center and being further configured to assign a local print job to the textile printing machines, instead of the print job of the data center. Moreover, an advantageous embodiment of the invention lies with control means of the respective network being configured to assign a global print job of the global platform to the textile printing machine of the respective network, which job is processable through the textile printing machine.

The module according to the invention is characterized in that the module is in communication with one of the at least two textile printing machines respectively and is configured to transmit data about the state, set-up, and/or utilization of the textile printing machine to the data center and, based on the transmitted data, to accept a print job of the data center, which job is processable through the textile printing machines. According to the invention, the module can be a unit, which is assigned respectively to a textile printing machine. The module can in particular be connected with the control means for controlling the at least one textile printing machine of the entity and can determine information with regard to the utilization, the set-up as well as the state of the textile printing machine. The state can indicate the state of the textile printing machine in particular with "On", "Off", "in maintenance", "ready for operation", "processing a job" and/or "idle".

Moreover, the module can be configured to determine if the textile printing machine is ready for operation (state) and/or which supply materials (set-up), for example textile and/or printer ink, is provided on the textile printing machine, in particular at the respective point in time of the determination. The module can be configured in particular in the form of a chip, a plug-in card for the textile printing machine or the control means, a textile printing machine extension of any desired construction and/or a software of the textile printing machine and/or the control means. The module can, in an advantageous way, be configured with a connection in the form of a remote communication channel, in particular as a remote data line, such as for example a connection to the internet (in particular World Wide Web) or a VPN (Virtual Private Network) connection to the data center, that is an online connection.

The module can be assigned, respectively, to one of the textile printing machines of an entity, that is one module per textile printing machine. Based on demand, the module can also be configured to be in communication with all textile printing machines of an entity and to transmit operationally-relevant information regarding all textile printing machines to the data center. A common module can thus also be provided for all textile printing machines, or at least for a part of the textile printing machines, of an entity.

According to the invention, the print job of the third party can be transmitted to the module, as well as to the control means of the textile printing machine. This can in particular depend upon if the module or the control means are managing the print jobs of the textile printing machine. The module can also be configured to accept print jobs from the data center and to transmit them to the control means, which in turn are configured to manage local print jobs, as well as print jobs from third parties and, for example in the form of a print job list with a defined order of execution, to manage the print jobs.

It can be advantageous, in particular with respect to a print job list of the at least one textile printing machine of the respective entity, that a communication of the respective module with the data center is interruptible, based on demand, wherein a local idle time of the textile printing machine is only usable for local print jobs. The module can in particular be configured to transmit information to the data center that at least the textile printing machine or machines of the entity, which are arranged in the module, are at least temporarily not available for print jobs of a third party. Based on demand, it can be switched between a combined utilization of the textile printing machine(s) from local print jobs from customers of the respective entity and print jobs from third parties via the data center, as well as a purely local utilization of the textile printing machines with only local print jobs. The module can also be configured to release individual textile printing machines for an issuing of only local print jobs, wherein at least one of the textile printing machines of the respective entity remains released to accept print jobs from third parties.

The invention is subsequently further described based on a preferred exemplary embodiment which is represented in the accompanying schematic drawing. The drawing shows in:

FIG. 1 a schematic illustration of an embodiment of the system according to the invention.

FIG. 1 shows an exemplary embodiment of the system according to the invention for the operation of textile printing machines 10. three entities I, II and III, independent of each other are illustrated, which entities each comprise at least one textile printing machine 10, a module 11 and a control means 20. These three components can be configured in different ways to one another. According to FIG. 1, three variants are represented by way of example for the interplay of the textile printing machines 10, the module 11 and the control means 20. In entity I, a module 11 can be assigned to each textile printing machine 10, which module can respectively be connected with the control means 20. The module 11 can hereby be configured as a standalone unit, which is connected with the textile printing machine 10, as well as with the control means 20. This construction can be configured with only one textile printing machine 10, with 3, 4, 5 or more textile printing machines 10. The interplay of the three components, according to the exemplarily-illustrated entity I, is particularly independent of the number of textile printing machines 10 provided, wherein the number of modules 11 can correspond to the number of textile printing machines. Moreover, the module 11 can be in connection with the data center 30.

At least one textile printing machine 10, a module 11, and a control means 20 can be provided in the exemplarily-illustrated entity II. The module 11 can be provided as an integral part of the textile printing machine 10, in particular as a chip, plug-in card, extension unit or similar, connected with the textile printing machine 10, and/or a program application added to the operating software of the textile printing machine 10, which application is configured to use already-present communications means of the textile printing machine 10 in order to transmit data regarding the state, the set-up and/or the utilization of the textile printing machine 10 to a data center 30. Accordingly, the module 11 and/or the textile printing machine 10 can, in particular according to the entity II, comprise means for transmitting data to the data center 30. Any quantity of printers can be assigned to the entity in this construction (entity II) as well, wherein one module 11 each can be part of one of the textile printing machines 10, or can at least be associated with said machines.

According to the exemplarily illustrated entity III, 1, 2, 3, 4, 5 or more textile printing machines 10 can be provided. These can be connected with a common module 11. Here, the module 11 can be configured to establish data with respect to a state, the configuration and/or the utilization of all of the printing machine 10 and to transmit this data to the data center 30. In particular, the module 11 can be connected with the control means 20 or can be configured as forming part of the arbitrary. In principle, the control means can be formed by at least one server, for example. The immediate user of the textile printing machine 10 of the respective entity can, via the control means 20, locally deliver print jobs to the textile printing machines 10. This can be made possible, as represented according to FIG. 1, via the respective module 11, or directly through a direct connection, not represented, of the respective control means 20 with the individual textile printing machines 10 of the respective entity. Likewise, the control means 20 can be configured to directly communicate with the data center 30, that is to transmit data regarding the textile printing machine 10 and to receive global print jobs from the data center 30. The respective module 11 can hereby be established to make available the data regarding the state, the set-up and/or the utilization, as well basically also further parameters, decisive for the procurement of global print jobs, of the respective textile printing machine 10 or the multiple textile printing machine 10, to the control means 20.

This variant, in which the control means 20 is configured to accept print jobs from the data center 30, can be provided independently of whether basically a construction according the entity I, II, III or further construction in the entity is provided with at least one textile printing machine 10 and a module 11.

As illustrated in FIG. 1, the respective modules 11 can, in the individual entities I, II and III, be connected with the data center 30, wherein the modules 11 transmit information and/or data about the state, the set-up and/or the utilization of the respective textile printing machine 10 to the data center 30. The data centers 30 can comprise at least one computer 31, which is connected with the data center 30. The data center 30 can in particular be a global server, which is available for a data communication/data exchange via any desired remote data line, the internet, via a VPN connection (Virtual Private Network), or in another fashion. The computer 31 can be in communication with the data center 30 via any data connection, as described above.

The computer 31 can be provided as an input terminal to the server(s), which constitutes the data center 30. Via an input mask, which can be represented, for example, in a browser window, a suitable software, or via another means, information for a global print job can be transmitted from a third party to the data center 30. Via the input mask, a print job can be transmitted from a third party to the data center 30.

The print job can in particular comprise information regarding the layout, the design, the color configuration, as well as further information relevant for a textile printing and can contain information regarding the necessary printing time, in order to implement the print job.

The data center 30 can be configured to compare the print job transmitted from a third party to the data center 30 with data which the modules 11 of the respective entities have transmitted, via the textile printing machines 10, to the data central 30. The data center 30 can hereby be configured to detect and/or establish idling times of the respective textile printing machines 10 in the individual entities, and to compare these with the expected required printing time for a print job from a third party.

Further, the data center 30 can be configured to compare the demands made through the print job of a third party with the ones of textile printing machines 10 present in the system according to the invention. If a correspondingly-equipped textile printing machine 10 can be found in the system according to the invention, which machine comprises the required supply materials (for example textiles, printer ink, and/or pretreatment materials) needed for the print job, the needed set-up (for example inkjet printing, screen printing and/or pretreatment units), as well as also correspondingly long unused printing time, that is a correspondingly long idling time, the data center 30 can transmit the print job to the corresponding textile printing machine 10 for processing.

In principle, the system according to the invention can comprise any number of entities operating independently of each other, which each per se can be structured as a set up according to the entity I, II, III represented by way of example or in another way. The set-up structure of the one entity, that this the respective interplay of textile printing machines 10, modules 11, and control means 20, can here be independent of the set-up structure of a further entity. Essentially, all entities of the system according to the invention can comprise the same set-up structures, or can also each be set up differently.

The invention claimed is:

1. A system for operating textile printing machines, with
a plurality of textile printing machines including a first textile printing machine and at least one second textile printing machine, which are provided in a first entity or a second entity, which are independent of each other, the first entity and the second entity each being a buyer of a respective one of the plurality of textile printing machines, each of the first entity and the second entity being capable of accepting local print jobs from direct customers of the respective entity, wherein
each textile printing machine is provided, by a machine manufacturer of each respective textile printing machine, with a data-processing module, which is configured to detect data about the state, set-up, and/or utilization of the textile printing machine and a textile and a printer ink provided on the textile printing machine,
each data-processing module can be activated on a request of the buyer of the textile printing machine, the buyer of the textile printing machine being one of the first entity and the second entity,
by the activated data-processing module, the textile printing machines transmit, via internet connection, the detected data including data on the textile and the printer ink to a data center of the machine manufacturer independently of the first entity, the second entity, and/or location, and the data center is configured to
- accept a print job from a third party, the third party being a customer that is not a direct customer of one of the first entity and the second entity,
- determine, based on the transmitted detected data, that the accepted print job from the third party fits the detected data of at least one of the plurality of textile printing machines belonging to one of the first entity and/or the second entity, and
- transmit the accepted print job to at least one of the respective determined textile printing machines, so far as sufficient free print time is available on the respective textile printing machine.

2. The system for operating textile printing machines according to claim 1, wherein
the data center is configured to compare the respective utilization of the plurality of textile printing machines with an expected print duration of print jobs of the data center.

3. The system for operating textile printing machines according to claim 1, wherein
at least for the first textile printing machine and the at least second textile printing machine, respectively, a control means, in particular a server are provided, which means is configured to make local print jobs available to one of the plurality of textile printing machines.

4. The system for operating textile printing machines according to claim 3, wherein
the at least two control means are respectively made available as part of a separate local network.

5. The system for operating textile printing machines according to claim 3, wherein
the control means of the textile printing machines are configured to pause and/or to cancel a print job accepted from the data center, and are further configured to assign a local print job to the textile printing machines instead of the print job of the data center.

6. The system for operating textile printing machines according to claim 3, wherein
the control means of the respective network are configured to assign a global print job of a global platform to the textile printing machine of the respective network, which job can be processed through the textile printing machine.

7. The system for operating textile printing machines according to claim 1, wherein
the data center comprises an input mask which can be reached, in particular via the internet, and is configured to make print jobs from third parties available to the data center.

8. The system for operating textile printing machines according to claim 7, wherein
the input mask can be represented within a browser window, and a print job from a third party for the data center, can be input into the input mask from any desired computer with an internet connection.

9. The system for processing textile printing machines according to claim 1, characterized in local print jobs, made subsequently available, can be processed in the respective entities, through the textile printing machines, with a priority relative to earlier print jobs of the data center.

\* \* \* \* \*